United States Patent [19]

Hariki

[11] Patent Number: 4,683,544
[45] Date of Patent: Jul. 28, 1987

[54] METHOD OF TEACHING AN OPERATION PROGRAM TO A LINE ROBOT WHEREIN A MASTER ROBOT POSITIONED AT A LOCATION REMOTE FROM SAID LINE ROBOT IS FIRST TAUGHT THE PROGRAM

[75] Inventor: Kazuo Hariki, Toyama, Japan

[73] Assignee: Kabushiki Kaisha Fujikoshi, Toyama, Japan

[21] Appl. No.: 657,381

[22] Filed: Oct. 2, 1984

[30] Foreign Application Priority Data

Nov. 16, 1983 [JP] Japan ................................ 58-214085

[51] Int. Cl.$^4$ .............................................. G05B 13/00
[52] U.S. Cl. .................................... 364/513; 364/191; 901/3
[58] Field of Search ................................. 364/191–193, 364/171, 513; 901/2–5, 8; 318/568

[56] References Cited

U.S. PATENT DOCUMENTS

| | | |
|---|---|---|
| 3,920,972 | 11/1975 | Corwin, Jr. et al. ................ 364/513 |
| 4,239,431 | 12/1980 | Davini .................................. 364/193 |
| 4,338,672 | 6/1982 | Perzley et al. ....................... 364/193 |
| 4,360,886 | 11/1982 | Kostas et al. ........................ 364/513 |
| 4,456,961 | 6/1984 | Price et al. ........................... 364/192 |
| 4,495,588 | 1/1985 | Nio et al. .............................. 364/513 |
| 4,517,652 | 5/1985 | Bennett et al. ...................... 364/191 |
| 4,517,653 | 5/1985 | Tguchihashi et al. ................... 901/3 |
| 4,575,802 | 3/1986 | Walsh et al. ......................... 364/513 |
| 4,590,578 | 5/1986 | Barto, Jr. et al. ................... 364/513 |

Primary Examiner—Jerry Smith
Assistant Examiner—John R. Lastova
Attorney, Agent, or Firm—Spencer & Frank

[57] ABSTRACT

An off-line teaching method for an industrial robot wherein a master robot, separate from a line robot, placed in an actual operation line, and a model work similar to the line work processed in the operation line are prepared. Four predetermined points which are not in the same plane are obtained on each of the works, and are taught to the line and master robots in the same order to obtain a reciprocal transformation matrix. The transformation matrix is used to automatically transform an operation program taught to the master robot into an operation program for the line robot.

1 Claim, 3 Drawing Figures

METHOD OF TEACHING AN OPERATION PROGRAM TO A LINE ROBOT WHEREIN A MASTER ROBOT POSITIONED AT A LOCATION REMOTE FROM SAID LINE ROBOT IS FIRST TAUGHT THE PROGRAM

BACKGROUND OF THE INVENTION

This invention relates to a method of teaching an operation to an industrial robot, and more particularly to an off-line teaching method for an industrial robot in which teaching is conducted not to a robot in the actual operating line but to a master robot placed off the line and the operation program thereby prepared is utilized as such for the robot in the line.

Conventionally, in the playback system industrial robots, instruction as to the desired operation, namely teaching, is conducted either by a remote teaching method using a teaching pendant or a joy stick, or by a direct teaching method in which the arms of a robot are actually held for the teaching thereof. These methods are the same in that the operations are taught to robots used in the actual operating line, so that the normal operation of the robots must be interrputed for teaching. This system may not cause a problem when the robots are first installed in the line, but when work is to be changed it imposes a heavy burden on the teaching operation especially under the pressure of time. For instance, when new work is to be processed during the next month in place of the present work, it is sometimes necessary to set aside at the end of the previous month an entire night for teaching the robot.

SUMMARY OF THE INVENTION

According to the invention there is provided an off-line teaching method for an industrial robot comprising the steps of: preparing a master robot separate from a line robot placed in an actual operating line and a model work similar to the line work processed in the operating line; previously determining, on each of the line and model works, four points which are not in the same plane; teaching the line and master robots the respective four points in the same order to obtain a reciprocal transformation matrix; teaching an operation program to the master robot by using the model work; and automatically transforming the operation program taught to the master robot into an operation program for the line robot by using the reciprocal transformation matrix. Thus, in teaching, a robot working in an actual operation line is not used but instead a master robot off the line is used, so that the above problems are solved. Besides, this enables operation programs for several tens of line robots to be produced by using one master robot.

DETAILED DESCRIPTION OF THE PREFERRRED EMBODIMENT

This invention will be described with reference to the accompanying drawings.

Figure 1:
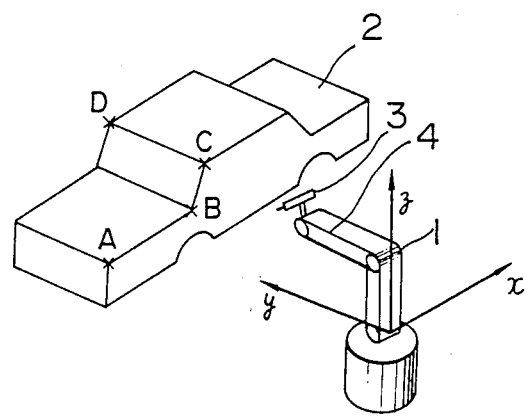
FIG. 1 shows the operating state of a line robot placed in an operation line.

Referring to FIG. 1, a line robot (1) is placed in an actual operating line and a line work (2) is placed near the line robot (1) to be processed in the line. A coordinate system having coordinate axes (x, y, z) is assumed on the line robot. A tool (3) is attached to the end of an arm (4) of the robot (1).

Figure 2:
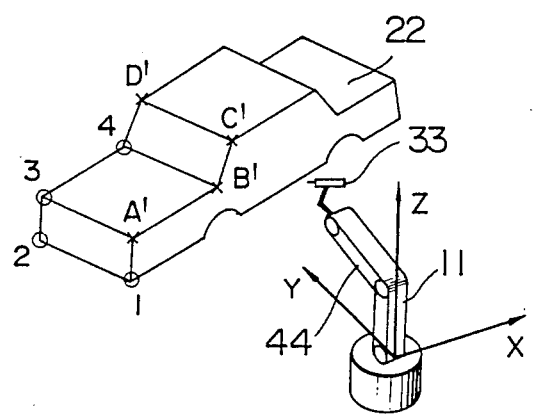
FIG. 2 shows the operating state of a master robot exclusively used for teaching.

Referring to FIG. 2, a master robot (11) exclusively used for teaching is placed in another room. A master work (22) similar to the line work is disposed near the master robot (11) as in FIG. 1. Further, a coordinate system having coordinate axes (X, Y, Z) is assumed on the master robot (11) as is the case with the line robot (1). A model tool (33) is attached to the end of an arm (44) of the master robot (11).

Now, the positions (P) of the ends of tools (3) and (33) are represented with vectors such as P (x, y, z) and P (X, Y, Z), respectively. Since the line work (2) and the master work (22) are completely similar, four points which are not in the same plane are previously determined on each of the works and they are considered as reference positions (A, B, C, D) and (A', B', C', D'), respectively. At this time, the point A is represented as vector $P_A(x_A, y_A, z_A)$, and the other points also represented similarly.

Figure 3:
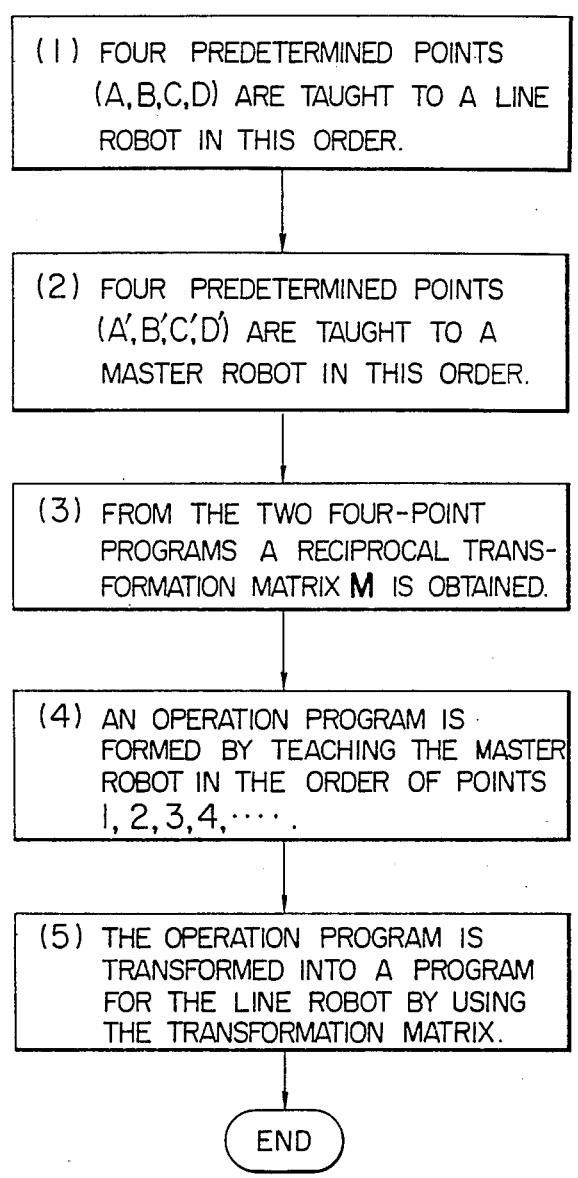
FIG. 3 is a flowchart of the invention.

Next, by processing in accordance with the flowchart shown in FIG. 3, the operation programs of $P_1$, $P_2$, $P_3$, . . . which have been taught to the master robot (11) can be automatically transformed into those for the line robot, simply with the four point teaching applied to the line robot (1).

This will be explained in more detail in accordance with the flowchart. In the first step, the predetermined four points (A, B, C, D) are first taught to the line robot (1) in that order to obtain the following data:

$$P_A (x_A, y_A, z_A)$$

$$P_B (x_B, y_B, z_B)$$

$$P_C (x_C, y_C, z_C)$$

$$P_D (x_D, y_D, z_D)$$

In the second step, the predetermined four points (A', B', C', D') are taught to the master robot (11) in that order to obtain the following data:

$$P_{A'} (X_A, Y_A, Z_A)$$

$$P_{B'} (X_B, Y_B, Z_B)$$

$$P_{C'} (X_C, Y_C, Z_C)$$

$$P_{D'} (X_D, Y_D, Z_D)$$

Further, in the third step, a transformation matrix M is obtained from the two four-point programs. A transformation matrix in three dimension space is expressed as a three row and four column matrix, providing that rotation, parallel displacement, symmetry, extension and diminution are considered. Thus, M is defined as follows:

$$M \underset{=}{d} \begin{pmatrix} m_{11} & m_{12} & m_{13} & m_{14} \\ m_{21} & m_{22} & m_{23} & m_{24} \\ m_{31} & m_{32} & m_{33} & m_{34} \end{pmatrix}$$

($\underset{=}{d}$ means being defined as, and $m_{ij}$ is a component of i row and j column.)

In the above definition, $m_{11} \sim m_{13}$, $m_{21} \sim m_{23}$ and $m_{31} \sim m_{33}$ are related to rotation, symmetry, extension and diminution, respectively, and $m_{14}$, $m_{24}$ and $m_{34}$ represent parallel displacement.

Each component of matrix $M$ is determined to obtain a transformation matrix. First, considering that $P_A$ is transformed into $P_A'$, the following formula is obtained:

$$P_A'(x_A, y_A, z_A) = M \cdot \begin{pmatrix} X_A \\ Y_A \\ Z_A \\ 1 \end{pmatrix} \quad (1)$$

(Here, 1 is a constant in consideration of parallel displacement.)

Similarly, considering the relation between $P_B$ and $P_B'$, $P_C$ and $P_C'$ and $P_D$ and $P_D'$, the following formulae are obtained.

$$P_B' = M \cdot \begin{pmatrix} X_B \\ Y_B \\ Z_B \\ 1 \end{pmatrix} \quad (2)$$

$$P_C' = M \cdot \begin{pmatrix} X_C \\ Y_C \\ Z_C \\ 1 \end{pmatrix} \quad (3)$$

$$P_D' = M \cdot \begin{pmatrix} X_D \\ Y_D \\ Z_D \\ 1 \end{pmatrix} \quad (4)$$

Each of the formulae (1), (2), (3) and (4) consists of three linear equations with twelve (12) unknowns, and synthesis of the formulae (1), (2), (3) and (4) forms a system of twelve linear equations with twelve (12) unknowns.

By solving this, matrix $M$ is determined. The necessary and sufficient condition for solving this linear equation system is that the four points are not on the same plane.

Next, in the fourth step, an operation program is taught to the master robot (11) in the order of points 1, 2, 3, 4 . . . to produce $P_i(x_i, y_i, z_i)$ where $i = 1, 2, 3, 4$ . . .

Finally, using the transformation matrix, this program is transformed into a program for the line robot (1) so that $P_j(x_j, y_j, z_j) = \cdot P_i$ is obtained.

This invention has many advantageous features as will be described in the following; Since, in teaching, a robot working in an actual operating line is not used but instead a master robot off the line is used, a mere copy of a program is sufficient for a change of program, and the period of suspension of a line robot which was heretofore 1 to 10 hours is shortened to less than a tenth, or several minutes, for example. Furthermore, since the master robot can be placed in a stable position, a safe teaching operation is ensured. In addition, using one master robot, an operation program for each of several tens of robots can be produced, and it is even possible to form a program for a robot of a different axis system and a different size.

What is claimed is:

1. An off-line teaching method for industrial robots including at least a line robot placed in an operating line for processing a line work arranged therein, said method comprising the steps of:

preparing, in addition to the line robot and the line work, a master disposed in a location remote from the operating line and a model work similar to the line work positioned adjacent said master robot;

selecting a first four reference points on said model work and a second corresponding four reference points on said line work, said first and second four reference points being located in different planes;

teaching said master robot said first four reference points at said location remote from the operating line;

teaching said line robot said second four reference points in the same order as said teaching of the first four reference points to the master robot;

obtaining a transformation matrix from the first four reference points taught to said master robot and the second four reference points taught to said line robot, said transformation matrix being obtained by solving a system of twelve linear equation with twelve unknowns, said linear equations being established by the first four reference points taught to said master robot and the second four reference points taught to said line robot;

teaching said master robot an operation program by using said model work in said location remote from said operating line; and transforming the operation program taught to said master robot into an operation program for said line robot by using said transformation matrix to thereby teach the operation program to said line robot.

* * * * *